(12) United States Patent
Mrazek et al.

(10) Patent No.: US 8,065,465 B1
(45) Date of Patent: Nov. 22, 2011

(54) MITIGATING MAIN CROSSBAR LOAD USING DEDICATED CONNECTIONS FOR CERTAIN TRAFFIC TYPES

(75) Inventors: Dane Mrazek, Redwood City, CA (US); Yongxiang Liu, Sunnyvale, CA (US); Yin Fung Tang, Mountain View, CA (US); David Glasco, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/482,337

(22) Filed: Jun. 10, 2009

(51) Int. Cl.
G06F 13/00 (2006.01)
G06F 3/00 (2006.01)
G06F 5/00 (2006.01)
G06F 15/16 (2006.01)

(52) U.S. Cl. .............. 710/317; 710/29; 710/53; 710/56; 710/316; 709/234; 709/235

(58) Field of Classification Search .................... 710/29, 710/53, 56, 316, 317; 709/234, 235
See application file for complete search history.

(56) References Cited

U.S. PATENT DOCUMENTS

| | | | | |
|---|---|---|---|---|
| 5,231,633 A * | 7/1993 | Hluchyj et al. | ............... | 370/429 |
| 5,604,866 A * | 2/1997 | Kolb et al. | ............... | 709/235 |
| 5,652,885 A * | 7/1997 | Reed et al. | ............... | 713/1 |
| 5,832,245 A * | 11/1998 | Gulick | ............... | 710/306 |
| 5,832,308 A * | 11/1998 | Nakamura et al. | ............... | 710/53 |
| 5,920,705 A * | 7/1999 | Lyon et al. | ............... | 709/240 |
| 5,958,024 A * | 9/1999 | Typaldos et al. | ............... | 710/26 |
| 6,044,406 A * | 3/2000 | Barkey et al. | ............... | 709/235 |
| 6,115,748 A * | 9/2000 | Hauser et al. | ............... | 709/234 |
| 6,377,546 B1 * | 4/2002 | Guerin et al. | ............... | 370/230 |
| 6,434,640 B1 * | 8/2002 | Keller | ............... | 710/52 |
| 6,715,055 B1 * | 3/2004 | Hughes | ............... | 711/170 |
| 6,915,372 B2 * | 7/2005 | Magill et al. | ............... | 710/317 |
| 7,080,168 B2 * | 7/2006 | Dasgupta et al. | ............... | 710/29 |
| 7,136,954 B2 * | 11/2006 | Check et al. | ............... | 710/310 |
| 7,426,602 B2 * | 9/2008 | Stewart et al. | ............... | 710/317 |
| 7,536,473 B2 * | 5/2009 | Ajanovic et al. | ............... | 709/234 |
| 7,631,128 B1 * | 12/2009 | Sgrosso et al. | ............... | 710/105 |
| 7,643,493 B1 * | 1/2010 | Sayrafian-Pour | ............... | 370/395.4 |

(Continued)

FOREIGN PATENT DOCUMENTS

| | | | | |
|---|---|---|---|---|
| JP | 57162556 | A | * | 10/1982 |
| JP | 61146092 | A | * | 7/1986 |
| JP | 06030017 | A | * | 2/1994 |

(Continued)

OTHER PUBLICATIONS

"NNRD444187: Dynamically Structured Messaging Mechanism", Apr. 1, 2001, IBM, IBM Technical Disclosure Bulletin, Iss. 444, p. 681.*

(Continued)

Primary Examiner — Faisal M Zaman
(74) Attorney, Agent, or Firm — Patterson & Sheridan, LLP

(57) ABSTRACT

One embodiment of the invention sets forth a control crossbar unit that is designed to transmit control information from control information generators to destination components within the computer system. The control information may belong to various traffic paradigms, such as short-latency data traffic, narrow-width data traffic or broadcast data traffic. The physical connections within the control crossbar unit are categorized based on the different types of control information being transmitted through the control crossbar unit. The physical connections belong to the following categories: one-to-one (OTO) connections, one-to-many (OTM) connections, valid-to-one (VTO) connections, valid-to-many (VTM) connections wire-to-one (WTO) connections and wire-to-many (WTM) connections.

9 Claims, 14 Drawing Sheets

U.S. PATENT DOCUMENTS

| | | | |
|---|---|---|---|
| 7,668,979 B1 * | 2/2010 | Wentzlaff | 710/33 |
| 7,698,477 B2 * | 4/2010 | Breti et al. | 710/29 |
| 7,698,478 B2 * | 4/2010 | Wang et al. | 710/29 |
| 7,802,026 B2 * | 9/2010 | Perozo et al. | 710/29 |
| 7,912,976 B2 * | 3/2011 | Guthrie et al. | 709/232 |
| 2004/0174879 A1 * | 9/2004 | Basso et al. | 370/392 |
| 2006/0174040 A1 * | 8/2006 | Check et al. | 710/29 |
| 2007/0233921 A1 * | 10/2007 | Sugiyama et al. | 710/110 |
| 2007/0297406 A1 * | 12/2007 | Rooholamini | 370/390 |
| 2009/0003209 A1 * | 1/2009 | Kalkunte et al. | 370/232 |

FOREIGN PATENT DOCUMENTS

| | | |
|---|---|---|
| JP | 09307561 A * | 11/1997 |
| WO | WO 9703549 A2 * | 2/1997 |

OTHER PUBLICATIONS

"NN950865: Small Computer System Interface Data Flow Control", Aug. 1, 1995, IBM, IBM Technical Disclosure Bulletin, vol. 38, Iss. 8, pp. 65-66.*

"NN9401531: Flow Control of Prioritized Data in a Multimedia Communications System", Jan. 1, 1994, IBM, IBM Technical Disclosure Bulletin, vol. 37, Iss. 1, pp. 531-532.*

"NN940131: Buffer-Insertion Ring Flow Control Mechanism", Jan. 1, 1994, IBM, IBM Technical Disclosure Bulletin, vol. 37, Iss. 1, pp. 31-32.*

* cited by examiner

MITIGATING MAIN CROSSBAR LOAD USING DEDICATED CONNECTIONS FOR CERTAIN TRAFFIC TYPES

BACKGROUND OF THE INVENTION

1. Field of the Invention

The present invention relates generally to the field of data transport management and, more specifically, to mitigating main crossbar load using dedicated connections for certain traffic types.

2. Description of the Related Art

In many computing systems, a data transport mechanism is responsible for the physical transfer of data from a source component to a destination component. The source and destination components may include system elements, such as computation engines and memory subsystems. As is well known, the bandwidth of the data transport mechanism is the rate of data transfer between the source and destination components, measured in bits per clock cycle. As is also well known, data is transmitted to and from components within a computing system in collections of bits, where a collection of bits is referred to as a 'data packet.' In general, the size of a single data packet may not exceed the bandwidth of the data transport mechanism.

Data that is transmitted from a source component to a destination component may be of various types and sizes. Further, data belonging to certain data types may have different delivery requirements than data belonging to other data types. For example, some data traffic, such as the state information associated with the source component, may need to be flow controlled when the rate of transmission of the source component is different than the rate of transmission of the destination component. Other data traffic, such as buffer space availability, may not need to be flow controlled when the rate of transmission of the source component is different than the rate of transmission of the destination component.

In some systems, the same physical channel within the data transport mechanism is used to transmit data of different types and sizes between two components. In such cases, the physical design of the data transport mechanism is usually optimized to handle the data traffic paradigm set forth by the majority of the data traffic transmitted through the data transport mechanism. For example, if the majority of the data traffic is being transmitted is large data packets, then the physical channel within the data transport mechanism is designed with a high bandwidth. Consequently, for data traffic transmitted in small data packets, the unused bandwidth is wasted. In certain computing systems, where there is a variety of data types being transmitted, optimizing the physical design of the data transportation mechanism based on the data traffic paradigm set forth by the majority of the data traffic may significantly impact performance within the computing system.

As the foregoing illustrates, what is needed in the art is a mechanism for efficiently transmitting different types of data between components within a computing system that, among other things, reduces the incidence of unused bandwidth in such transmissions.

SUMMARY OF THE INVENTION

One embodiment of the present invention sets forth a parallel processing unit that includes one or more general processing clusters (GPCs) for processing data, a main crossbar unit configured to route data between the one or more GPCs and/or between the one or more GPCs and one or more memory partition units, a control crossbar unit including at least one type of dedicated connection and configured to route control information generated by one or more control information generators within the parallel processing unit and one or more destination components within the parallel processing unit, and the one or more memory partitions. Each memory partition including frame buffer logic that couples the memory partition to an external memory unit and an intermediary cache unit for temporarily storing data being processed by the one or more GPCs or data being transmitted to or from the external memory unit.

In various embodiments, the control crossbar unit may include a one-to-one connection, a one-to-many connection, a valid-to-one connection, a valid-to-many connection, a wire-to-one connection and/or a wire-to-many connection. Certain connections also may or may not implement flow control mechanisms.

One advantage of the disclosed parallel processing unit is that the control crossbar unit implements different types of dedicated transmission channels to transmit different types of control information to destination components within the parallel processing unit. Using the control crossbar unit in this fashion reduces the load on the main crossbar unit. Further, bandwidth waste that normally would occur if the same transmission channel were used to transmit the different types of control information is reduced because each of the dedicated transmission channels is optimized to efficiently transmit a particular type of control information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
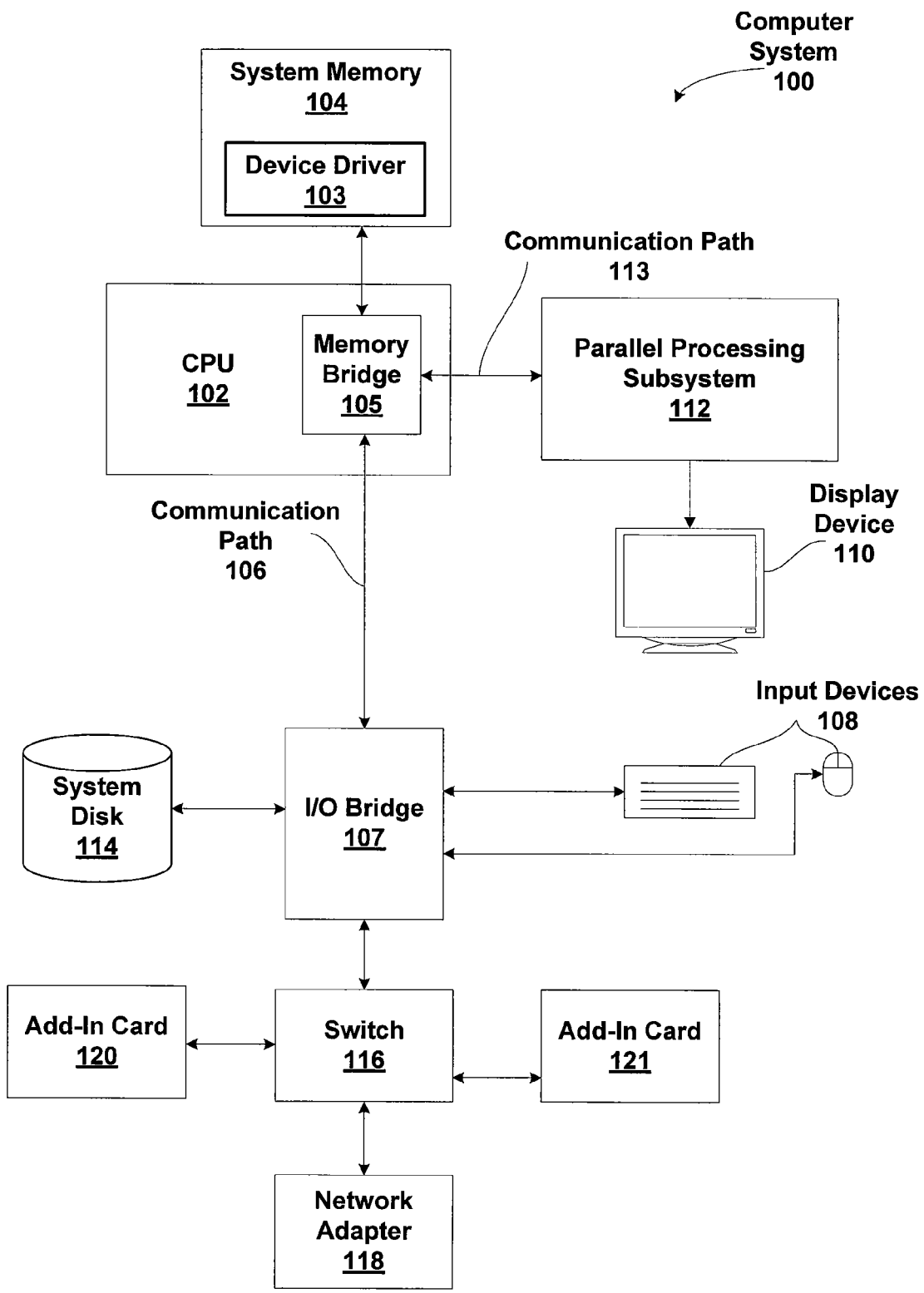
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
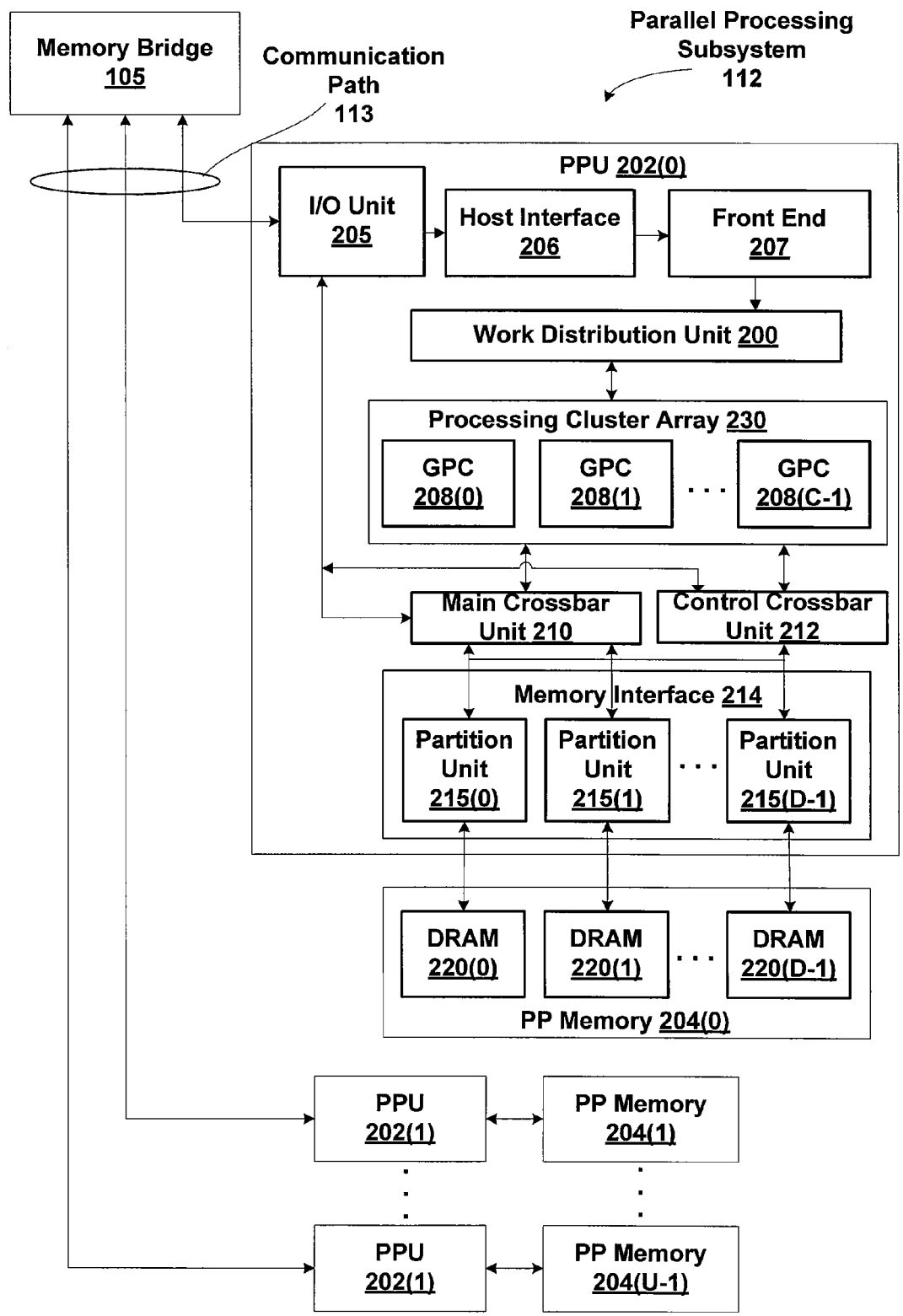
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory main crossbar unit 210. Host interface 206 reads each command buffer and outputs the work specified by the command buffer to a front end 207.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end 207. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 207, or may receive the data directly from front end 207. In some embodiments, indices specify the location of the data in an array. Front end 207 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Main crossbar unit 210 is configured to route the output of each GPC 208 to the input of any partition unit 214 or to another GPC 208 for further processing. GPCs 208 communicate with memory interface 214 through main crossbar unit 210 to read from or write to various external memory devices. In one embodiment, main crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Main crossbar unit 210 may use virtual channels to separate traffic streams between the GPCs 208 and partition units 215. Control crossbar unit 212 is configured to route control information from the various components (referred to herein as "control information generators") with the GPCs 208 to destination components. Control information generators may transmit internal state information or size information of internal buffers to the destination components. Control crossbar unit 212 includes different physical connection types, where each physical connection type is optimized to transmit a particular type of control information.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
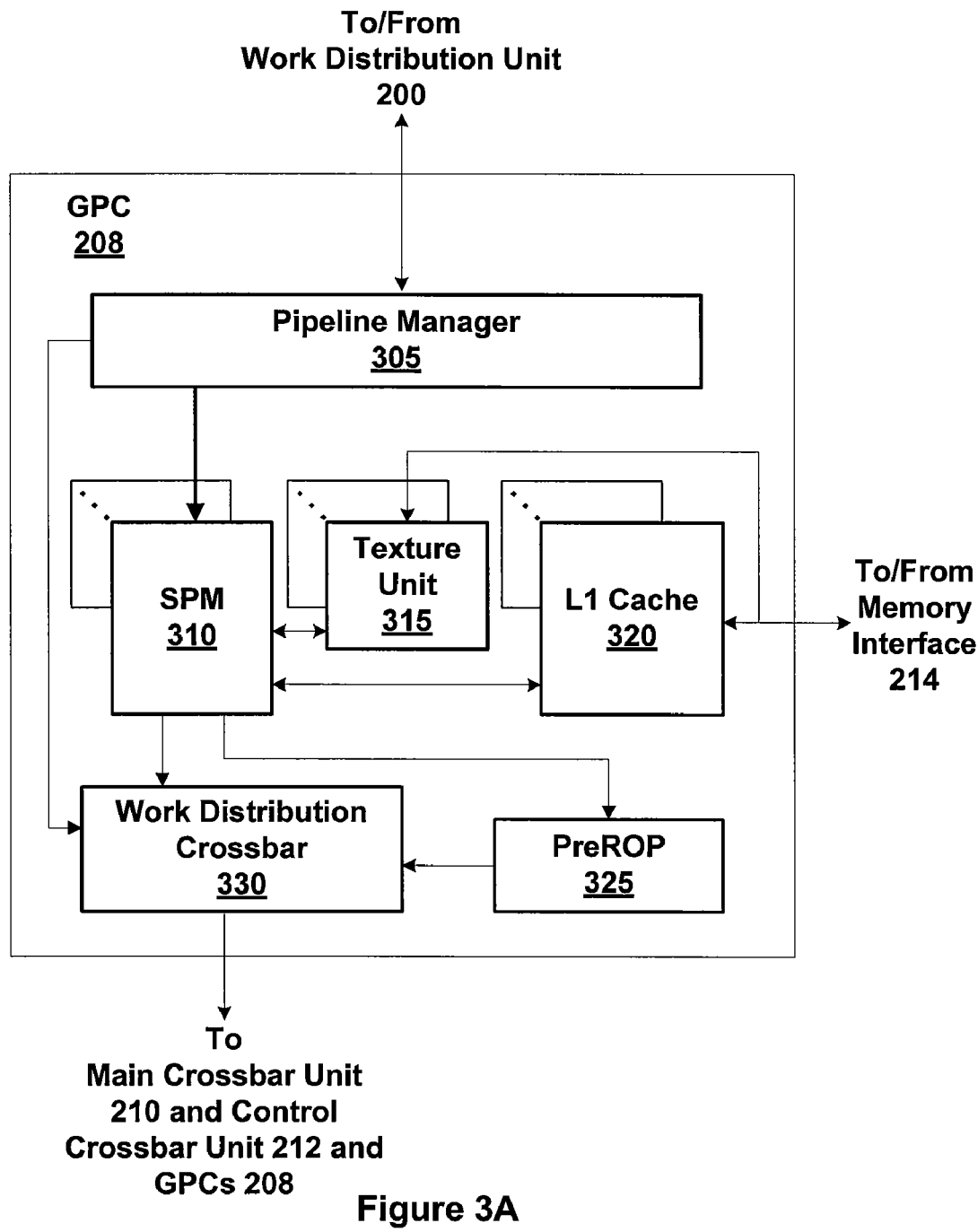
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via main crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
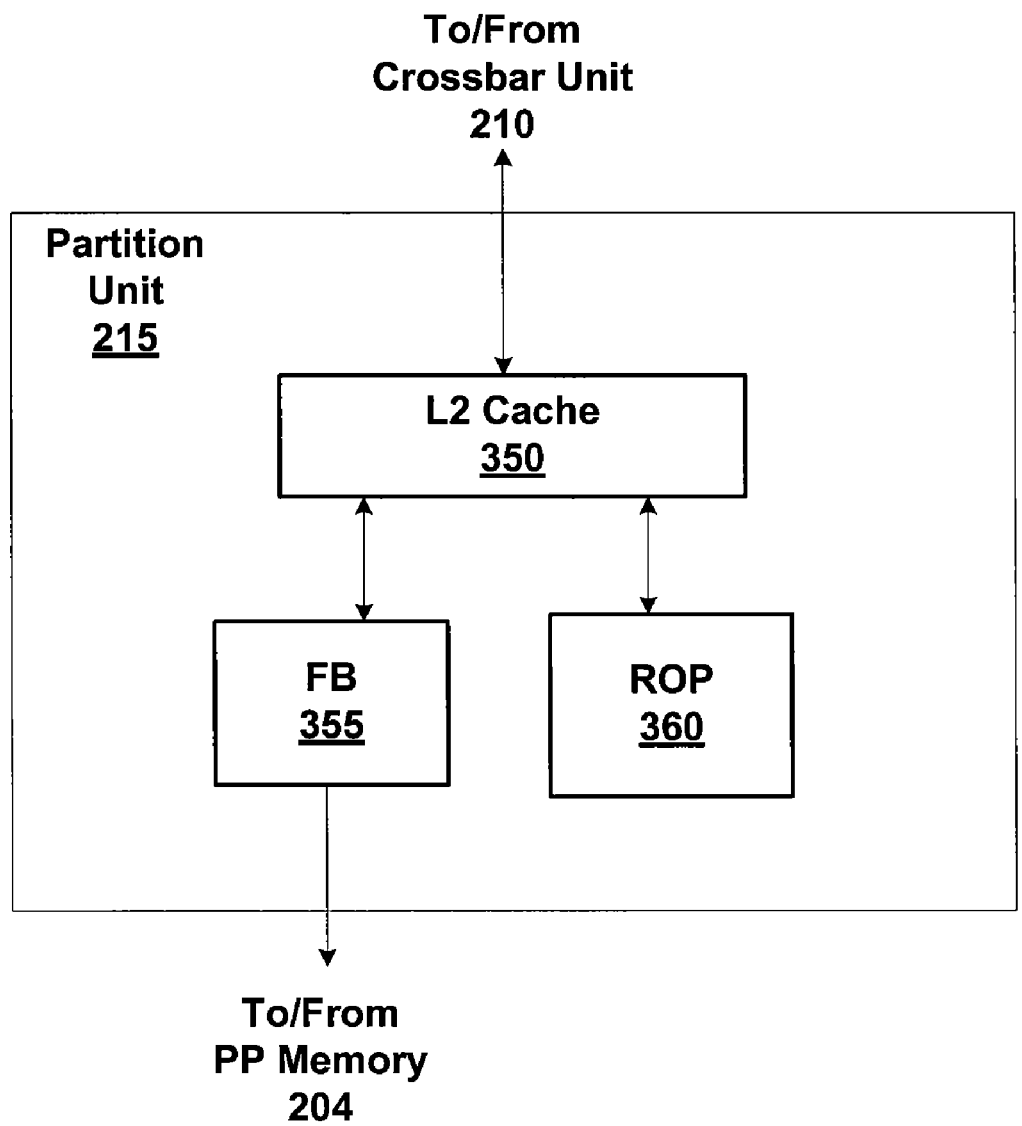
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from main crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over main crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Transmitting Control Information

Figure 4:
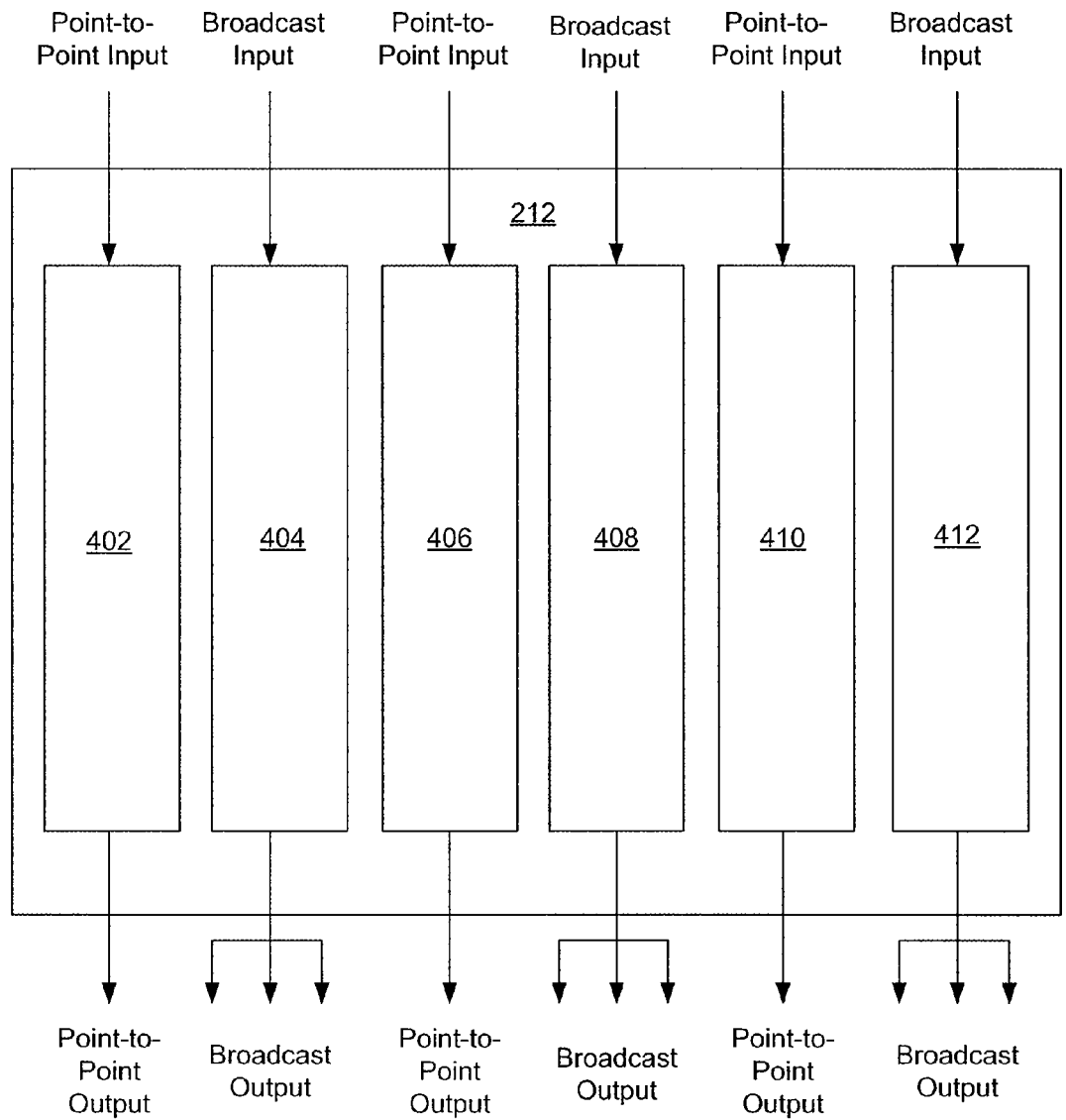
FIG. 4 is a detailed block diagram of the control crossbar unit 212 of FIG. 2, according to one embodiment of the present invention.

FIG. 4 is a detailed block diagram of the control crossbar unit 212 of FIG. 2, according to one embodiment of the present invention. The control crossbar unit 212 includes six dedicated connection types that may be used to transmit control information from control information generators to destination components. The six connection types are: a one-to-one (OTO) connection 402, a one-to-many (OTM) connection 404, a valid-to-one (VTO) connection 406, a valid-to-many (VTM) connection 408, a wire-to-one (WTO) connection 410 and a wire-to-many (WTM) connection 412.

As previously described, the work distribution crossbar 330 receives control information from various clients within the GPCs 208 and routes the control information to the control crossbar unit 212 for transmission to the destination component(s). Control information may be of various types, such as short-latency data traffic, narrow-width data traffic or broadcast data traffic. Each of the connection types included in the control crossbar unit 212 is optimized to transmit a particular type of control information. Based on the type of control information, the control crossbar unit 212 transmits the control information to the appropriate one of the one-to-one (OTO) connection 402, one-to-many (OTM) connection 404, valid-to-one (VTO) connection 406, valid-to-many (VTM) connection 408, wire-to-one (WTO) connection 410 and wire-to-many (WTM) connection 412.

The OTO connection 402 provides a point-to-point data transmission channel with flow control between a control information generator and a destination component. As is well known, flow control is the process of managing the rate of data transmission between a source component and a destination component to prevent a source component with a fast clock domain from over running a destination component with a slower clock domain. Data signals transmitted over a flow controlled data transmission channel ensure that the source input signal matches the destination output signal. For example, if the input signal is five distinct high pulses, then the output signal is five distinct high pulses. Flow control is achieved by implementing a crediting mechanism that allows the control information to be brought into the clock cycle of the destination component. A credit corresponds to a unit of memory space in which a data packet of control information may be stored. In one embodiment, the OTO connection is used to transmit control information generated by the SPM 310 within the GPCs 208 to the I/O unit 205.

The OTM connection 404 provides a broadcast data transmission channel with flow control between a control information generator and several destination components. The OTM connection 404 may be used to transmit control information belonging to the broadcast data type. In one embodiment, the OTM connection 404 is used to transmit control information between the preROP 325 within the GPCs 208 and the different memory partitions 215.

The VTO connection 406 provides a point-to-point data transmission channel that transmits valid states from the control information generator to a destination component. As is well known, a valid state reflects a single pulse or a single high signal. The VTO connection 406 may be used to transmit control information belonging to the narrow-width data type, for example counter information associated with memory space availability. In one embodiment, the VTO connection 406 is used to transmit memory space availability information from the SPM 310 within the GPCs 208 to the memory partitions 215. The VTM connection 408 provides a broadcast data transmission channel that transmits valid states from the control information generator to several destination components. In one embodiment, the OTM connection 404 is used to transmit memory space availability information between the preROP 325 within the GPCs 208 and the different memory partitions 215.

The WTO connection 410 provides a point-to-point data transmission channel without flow control between a control information generator and a destination component. As there is no flow control, the WTO connection 410 is used to transmit control information that does not vary often, to avoid control information being lost. In one embodiment, the WTO connection 410 is used to transmit control information from the SPM 310 to the front end 207. A WTM connection 412 provides a broadcast data transmission channel without flow control between a control information generator and several destination components. In one embodiment, the WTO connection 410 is used to transmit control information from the front end 207 to the different SPM 310 within the GPCs 208.

Figure 5A:
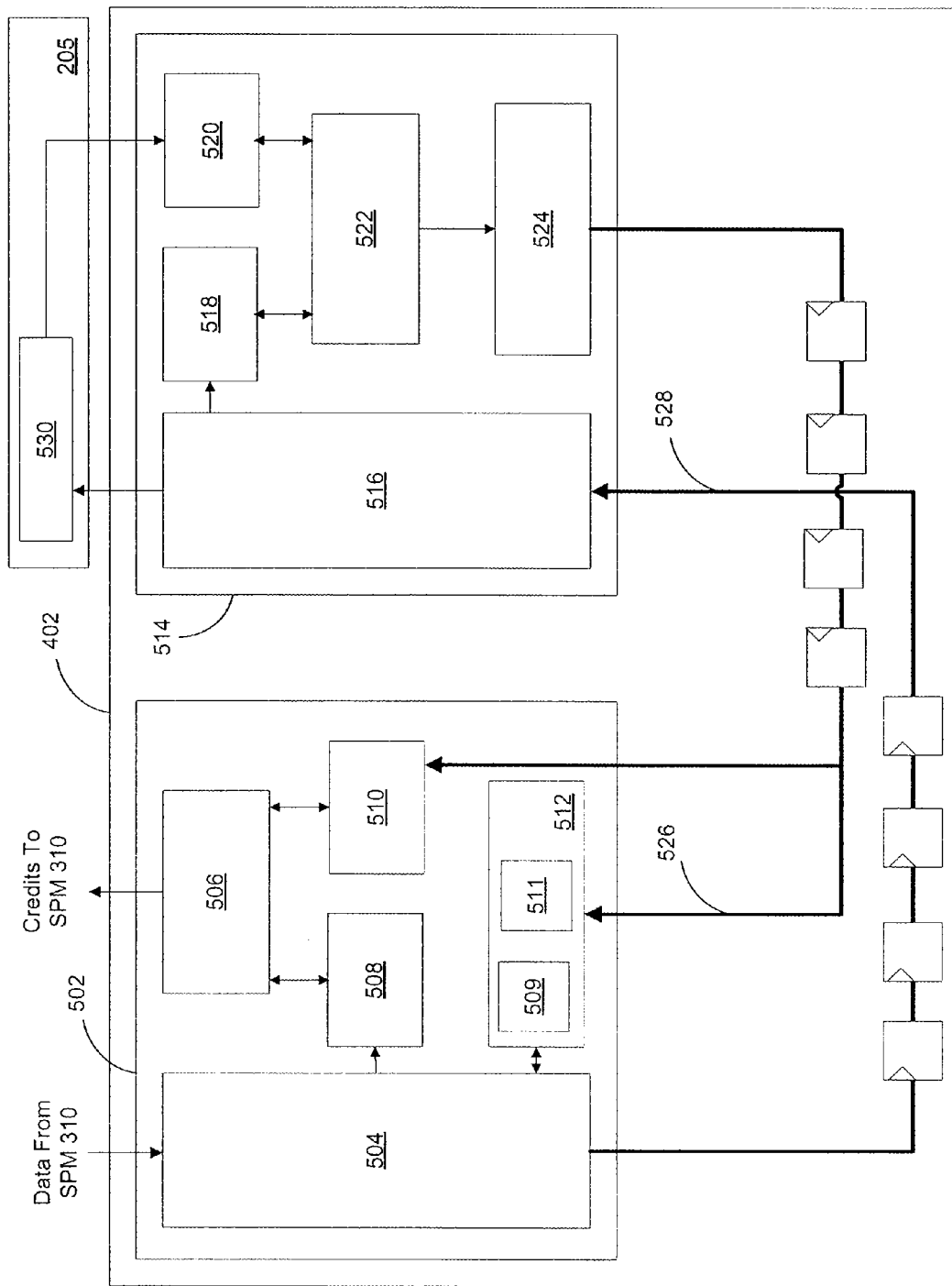
FIG. 5A is a detailed block diagram of the one-to-one connection of FIG. 4, according to one embodiment of the present invention.

FIG. 5A is a detailed block diagram of the one-to-one connection (OTO) connection 402 of FIG. 4, according to one embodiment of the present invention. As shown, the OTO connection 402 includes a source credit interface 502 and a destination credit interface 514, a credit path 526 and a data path 528. In this embodiment, the OTO connection 402 is used to transmit control information between the SPM 310 and the I/O unit 205.

The source credit interface 502 includes a source data buffer 504, a source credit releaser 506, a source data buffer counter 508, a destination counter 510 and a credit consumer 512. The source credit interface 502 is coupled to the work distribution crossbar 330 and is configured to receive control information from the SPM 310 (i.e., from a control information generator within the GPCs 208) via the work distribution crossbar 330. The source credit interface 502 is also configured to transmit packets of control information to the destination credit interface 514 via the data path 528.

The source data buffer 504 is a first-in-first-out (FIFO) asynchronous buffer that is configured to store control information received from the work distribution crossbar 330. The source data buffer 504 stores the control information until the control information can be transmitted to the destination credit interface 514, via the data path 528. The source credit releaser 506 is configured to release credits one-by-one to the SPM 310 via the work distribution crossbar 330 based on the counts of the source data buffer counter 508 and the destination counter 510. The count of the source data buffer counter 508 reflects the memory space available in the source data buffer 504. The count of the destination counter 510 reflects the number of credits available in the destination credit interface 514. Again, a credit corresponds to a unit of memory space in which a data packet of control information may be stored. The source credit releaser 506 releases credits to the SPM 310 via the work distribution crossbar 330 only if the counts of the source data buffer counter 508 and the destination counter 510 are greater than zero. Releasing credits only if the counts of the source data buffer counter 508 and the destination counter 510 are greater than zero ensures that the SPM 310 transmits data packets of control information to the source data buffer 504 only when memory space is available to store those data packets.

The credit consumer 512 is configured to command the source data buffer 504 to transmit data packets of control information stored in the source data buffer 504 based on two internal counters, a received credits counter 511 and a consumed credits counter 509. The count of the received credits counter 511 reflects the number of credits received from the destination credit interface 514. A credit received from the destination credit interface 514 indicates the availability of a unit of memory space within the destination credit interface 514 and internal buffer 530 for storing a data packet of control information. The credit consumer 512 tracks memory space availability in the destination credit interface 514 by incrementing the received credits counter 511 each time a credit is received from the destination credit interface 514. The count of the consumed credits counter 509 reflects the number of credits consumed by the credit consumer 512. Each time a data packet of control information is transmitted from the source data buffer 504 to the destination credit interface 514, the credit consumer 512 increments the consumed credits counter 509. The credit consumer 512 commands the source data buffer 504 to transmit a data packet of control information to the destination credit interface 514 only if the count of the received credits counter 511 is greater than the count of the consumer credits counter 509. Transmitting data packets of control information to the destination credit interface 514 only if the count of the received credits counter 511 is greater than the count of the consumer credits counter 509 ensures that, at any given clock cycle, there is memory space availability in the destination credit interface 514 to store the in-flight data packets of control information The destination credit interface 514 includes a destination data buffer 516, a destination data buffer counter 518, an internal buffer counter 520, a destination credit releaser 522 and a credit producer 524. The destination credit interface 514 is coupled to the I/O unit 205 and is configured to transmit control information received from the source credit interface 502 to the I/O unit 205. The destination credit interface 514 is also configured to transmit available credits to the source credit interface 502 via the credit path 526.

The destination data buffer 516 is a first-in-first-out (FIFO) asynchronous buffer that is configured to store control information received from the source data buffer 504 via the data path 528. The destination data buffer 516 stores the control information until the control information can be transmitted to the I/O unit 205. At any given clock cycle, the count of the destination data buffer counter 518 reflects the number of credits available in the destination data buffer 516 to store data packets of control information. The count of the internal buffer counter 520 reflects the number of credits available in the internal buffer 530 within the I/O unit 205 to store data packets of control information. The destination credit releaser 522 is configured to release credits to the credit producer 524 only if the counts of the destination data buffer counter 518 and the internal buffer counter 520 are greater than zero. Releasing credits only if the counts of the destination data buffer counter 518 and the internal buffer counter 520 are greater than zero ensures that the number of data packets of control information transmitted by the source data buffer 504 does not exceed the memory space available within the destination credit interface 514. The credit producer 524 is configured to transmit credits received from the destination credit releaser 522 to the credit consumer 512 and the destination counter 510 via the credit path 526.

Before transmission of control information from the SPM 310 to the I/O unit 205 begins, the count of the source data buffer counter 508 is initialized to reflect the size of the source data buffer counter 508. Because of the latency in receiving a credit from the destination credit interface 514, the count of the destination counter 510 is initialized to reflect an initial default value (herein referred to as "value N"). The value N is determined by the number of clock cycles needed to transmit one credit from the credit producer 524 to the credit consumer 512 via the credit path 526. The received credits counter 511 in the credit consumer 512 is also initialized to the value N, while the consumed credits counter 509 is initialized to zero. Similarly, the count of the destination data buffer counter 518 is initialized to reflect the size of the destination data buffer counter 516. The count of the internal buffer counter 520 is initialized to reflect the size of the internal buffer 530 in the I/O unit 205. When the transmission of control information begins, the source credit interface 502 begins consuming available credits, and the destination credit interface begins releasing credits.

Within the source credit interface 502, the source credit releaser 506 releases a credit to the work distribution crossbar 330. Again, the source credit releaser 506 releases a credit only when the count of the source data buffer counter 508 and the destination counter 510 are greater than zero. When a credit is released, the source credit releaser 506 decrements the counts of the source data buffer counter 508 and the destination counter 510 by one. Upon receiving the credit via the work distribution crossbar 330, the SPM 310 transmits a single packet of control information to the source data buffer 504. The source credit releaser 506 continues to release credits (one credit per clock cycle) to the SPM 310 via the work distribution crossbar 330 while the counts of both the source data buffer counter 508 and the destination counter 510 are greater than zero. If, at any clock cycle, the count of either the source data buffer counter 508 or the destination counter 510 is zero, then the source credit releaser 506 stops releasing credits. Again, releasing credits only if the counts of the source data buffer counter 508 and the destination counter 510 are greater than zero ensures that the SPM 310 transmits data packets of control information to the source data buffer 504 only when memory space is available to store those data packets.

Within the destination credit interface 514, the destination credit releaser 522 releases a credit to the credit producer 524. Again, the destination credit 522 releases a credit only when the count of the destination data buffer counter 518 and the internal buffer counter 520 is greater than zero. When a credit is released, the destination credit releaser 522 decrements the count reflected in both of the destination data buffer counter 518 and internal buffer counter 520 by one. Upon receiving a credit from the destination credit releaser 522, the credit producer 524 transmits the credit to the credit consumer 512 and the destination counter 510 via the credit path 526. As previously described herein, because of the latency associated with transmitting a credit from the credit producer 524 to the credit consumer 512 via the credit path 526, the credit is received by the credit consumer 512 and the destination counter 510 N clock cycles after the credit is transmitted.

At every clock cycle, the credit consumer 512 determines the counts of the received credits counter 511 and the consumed credits counter 509. If the count of the received credits counter 511 is greater than the count of the consumed credits counter 509, then the credit consumer 512 causes a data packet of control information stored at the top of the source data buffer 504 to be transmitted to the destination data buffer 516 via the data path 528. The consumed credits counter 509 is then incremented by the credit consumer 512 to indicate that a unit of memory space in the destination data buffer 516 is occupied by the newly transmitted data packet of control information. Concurrently, when a packet of control information is transmitted from the source data buffer 504, the count of the source data buffer counter 508 is incremented by the source data buffer 504 to indicate the availability of the memory space vacated by the newly transmitted data packet. As previously described herein, the count of the source data buffer counter 508 reflects the number of credits available to store data packets of control information within the source data buffer 504.

When a data packet of control information is received by the destination data buffer 516, the count of the destination data buffer counter 518 is decremented by the destination data buffer 516 indicating that a credit is consumed by the newly received data packet. The data packet of control information remains stored in the destination data buffer 516, until the data packet of control information is retrieved by the I/O unit 205 for storage in the internal buffer 530. The count of the internal buffer counter 520 is decremented by the destination data buffer 516 when a data packet of control information is retrieved by the I/O unit 205 from the destination data buffer 516. Decrementing the count of the internal buffer counter 520 indicates that a memory space within the internal buffer 530 is occupied by the newly retrieved data packet of control information. When a data packet of control information is transmitted from the internal buffer 530, the I/O unit 205 increments the count of the internal buffer counter 520, indicating the availability of a memory space within the internal buffer 530.

To facilitate the discussion of the operation of the source credit interface 502 and the destination credit interface 514, an example involving the transmission of two data packets of control information is provided. In this example the value of N is one, and each of the source data buffer counter 508, destination data buffer counter 518 and internal buffer counter 520 is initialized to fifteen. The destination counter 510 and received credits counter 511 are each initialized to the value of N as well, i.e., one.

When the transmission begins, at clock cycle one, the source credit releaser 506 transmits one credit to the SPM 310 via the work distribution crossbar 330, since the counts included the source data buffer 508 and the destination counter 510 are greater then zero. The source credit releaser 506 then decrements the counts of the source data buffer counter 508 and the destination counter 510. Because the count reflected by the destination counter 510 is now zero, no more credits are released by the source credit releaser 506. Concurrently, the destination credit releaser 522 releases a first credit to the credit producer 524, since the count reflected by each of the destination data buffer counter 518 and the internal buffer counter 520 is greater than zero. The counts of both the destination data buffer counter 518 and the internal buffer counter 520 are decremented by one.

At clock cycle two, the credit producer 524 transmits the first credit to the credit consumer 512 and the destination counter 510 via the credit path 526. As previously described herein, due to the latency when transmitting credits, the first credit transmitted by the credit producer 524 is received by the credit consumer 512 and destination counter 510 one clock cycle later. The destination credit releaser 522 releases a second credit to the credit producer 524 as the counts reflected by each of the destination data buffer counter 518 and the internal buffer counter 520 is greater than zero. The counts reflected by each of the destination data buffer counter 518 and the internal buffer counter 520 is then decremented by one.

Also at clock cycle two, upon receiving the credit transmitted by the work distribution crossbar 330, the SPM 310 transmits the first packet of control information to the source data buffer 504. Concurrently, because the received credits counter 511 is one (the initialization value), the credit consumer 512 causes the first packet of control information stored in the source data buffer 504 to be transmitted to the destination data buffer 516 via the data path 528. The received credits counter 511 is decremented and the consumed credits counter 509 is incremented.

At clock 3, both the credit consumer 512 and destination counter 510 receive the first credit from the credit producer via the credit path 526. The credit consumer 512 increments the received credits counter 511 upon received the first credit. The source credit releaser 506 releases another credit to the SPM 310, via the work distribution crossbar 330 as the counts reflected in each of the source data buffer counter 508 and the destination counter 510 is greater than zero. The count reflected by each of the source data buffer counter 508 and the destination counter 510 is then decremented by the source credit releaser 506. Concurrently, the first data packet of control information transmitted over the data path 528 is received by the destination data buffer 516. Also, the credit producer 524 transmits the second credit to the credit consumer 512 and the destination counter 510 via the credit path 526

At clock cycle 4, the second packet of control information is transmitted by the SPM 310 to the source data buffer 504. Concurrently, because the count reflected by the received credits counter 511 is two and the count reflected by the consumed credits counter is 511 is one, the credit consumer 512 causes the second packet of control information stored in the source data buffer 504 to be transmitted to the destination data buffer 516 via the data path 528. The received credits counter 511 is decremented, and the consumed credits counter 509 is incremented. Also at clock cycle 4, the first packet of control information is transmitted to the internal buffer 530 in the I/O unit 205. The destination data buffer counter 518 is then incremented indicating the availability of one credit. The internal buffer counter 520 is incremented at a later clock cycle when the first packet of control information is retrieved from the internal buffer 530 in the I/O unit 205.

At clock cycle 5, the second packet of control information is received by the destination data buffer 516. At clock cycle 6 the second packet of control information is transmitted to the internal buffer 530 in the I/O unit 205. The destination data buffer counter 518 is then incremented, indicating the availability of one credit. The internal buffer counter 520 is incremented at a later clock cycle when the first packet of control information is retrieved from the internal buffer 530 in the I/O unit 205.

Figure 5B:
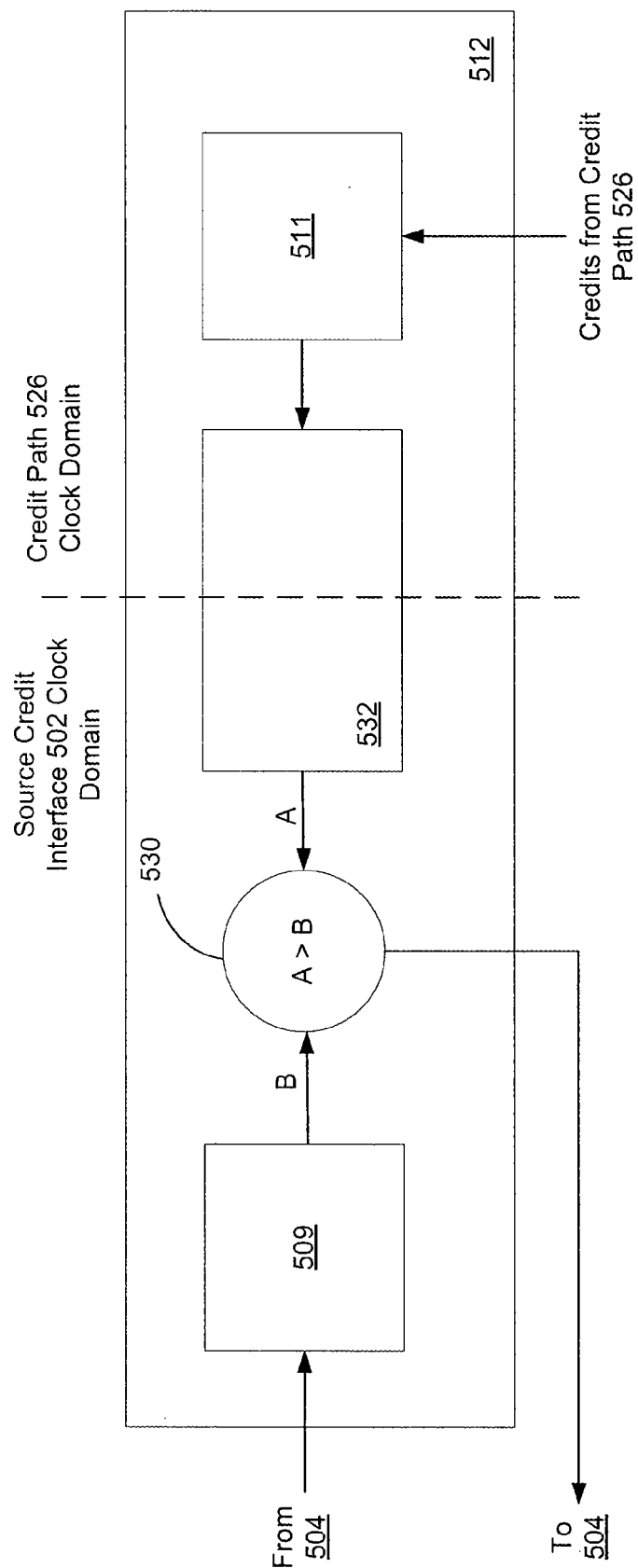
FIG. 5B is a detailed block diagram of the credit consumer of FIG. 5A, according to one embodiment of the present invention.

FIG. 5B is a detailed block diagram of the credit consumer 512 of FIG. 5A, according to one embodiment of the present invention. As shown, the credit consumer 512 includes the consumed credits counter 509, the received credits counter 511, the credit consumer logic 530 and the synchronization block 532.

As previously described, the count of the consumed credits counter 509 reflects the number of credits consumed by the credit consumer 512 to transmit data packets of control information to the destination data buffer 516. The count of the received credits counter 511 reflects the number of credits received from the destination credit interface 514 via the credit path 526. Because the clock domain of the credit path 526 is different than the clock domain of the source credit interface 502, the count of the received credits counter 511 is synchronized with the clock domain of the source credit interface 502 by the synchronization block 532. Once the count of the received credits counter 511 is synchronized, the count is transmitted to the credit consumer logic 530 for further processing. The credit consumer logic 530 determines whether the count of the received credits counter 511 is greater than the count of consumer credits counter 509. If so, then the credit consumer logic 530 causes a data packet of control information to be transmitted from the source data buffer 504 to the destination data buffer 516 via the data path 528.

Figure 6:
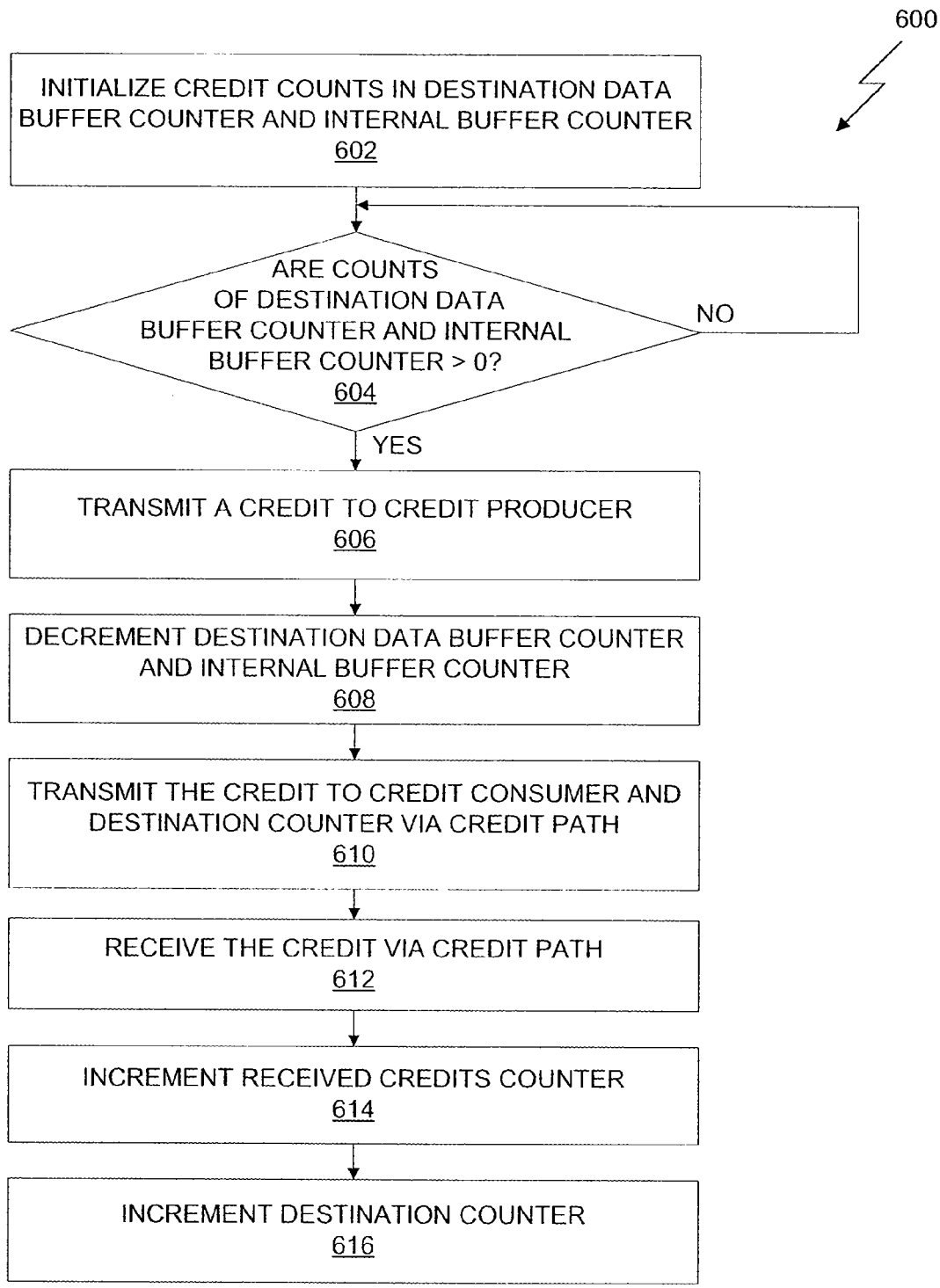
FIG. 6 illustrates a flow diagram of method steps for transmitting a credit from the destination credit interface of FIG. 5A to the source credit interface of FIG. 5A, according to one embodiment of the present invention.

FIG. 6 illustrates a flow diagram of method steps for transmitting a credit from the destination credit interface 514 of FIG. 5A to the source credit interface 512 of FIG. 5A, according to one embodiment of the present invention. Although the method steps are described in conjunction with the systems for FIGS. 1-5B, persons skilled in the art will understand that any system configured to perform the method steps, in any order, is within the scope of the invention.

The method 600 begins at step 602, where the counts of the destination data buffer counter 518 and the internal buffer counter 520 are initialized to reflect the credits available in the destination data buffer 516 and the internal buffer 530, respectively. As described in conjunction with FIG. 4, a credit corresponds to a memory space in which a data packet of control information may be stored. At step 604, the destination credit releaser 522 determines whether the counts of both the destination data buffer counter 518 and internal buffer counter 520 are greater than zero. If either count is equal to zero, then the destination credit releaser 522 continues to poll the destination data buffer counter 518 and the internal buffer counter 520 until both counts become greater than zero.

At step 604, if the counts of the destination data buffer counter 518 and the internal buffer counter 520 are both greater than zero, then the method 600 proceeds to step 606, where the destination credit releases 522 transmits a credit to the credit producer 524. Importantly, the destination credit releaser 522 releases a credit only when both counts are greater than zero, which ensures that memory space is available to store the data packet of control information transmitted by the source credit interface 502 in response to that credit. At step 608, the destination credit releaser 522 decrements the counts of both the destination data buffer counter 518 and the internal buffer counter 520.

At step 610, the credit producer 524 transmits the received credit to the credit consumer 512 and the destination counter 510 in the source credit interface 502 via the credit path 526. At step 612, the credit is received by the credit consumer 512 and the destination counter 510. As described in conjunction with FIG. 5A, due to the latency when transmitting credits via the credit path 526, the credit is received by the credit consumer 512 and the destination counter 510 a predetermined number of clock cycles after the credit is transmitted by the credit producer 524. At step 614, the count of the received credits counter 511 is incremented by the credit consumer 512. The credit received by the received credits counter 511 is used by the credit consumer 512 to determine a clock cycle at which a data packet of control information may be transmitted from the source data buffer 504 to the destination data buffer 516 via the data path 528. At step 616, the count of the destination counter 510 is incremented. The credit received by the destination counter 510 is used by the source credit releaser 506 to determine when a credit may be released to the SPM 310. As previously described herein, when an SPM 310 receives a credit from the source credit releaser 506, the SPM 310 transmits a packet of control information to the source data buffer 504 that is transmitted to the destination data buffer 516 at a later clock cycle.

Figure 7A:
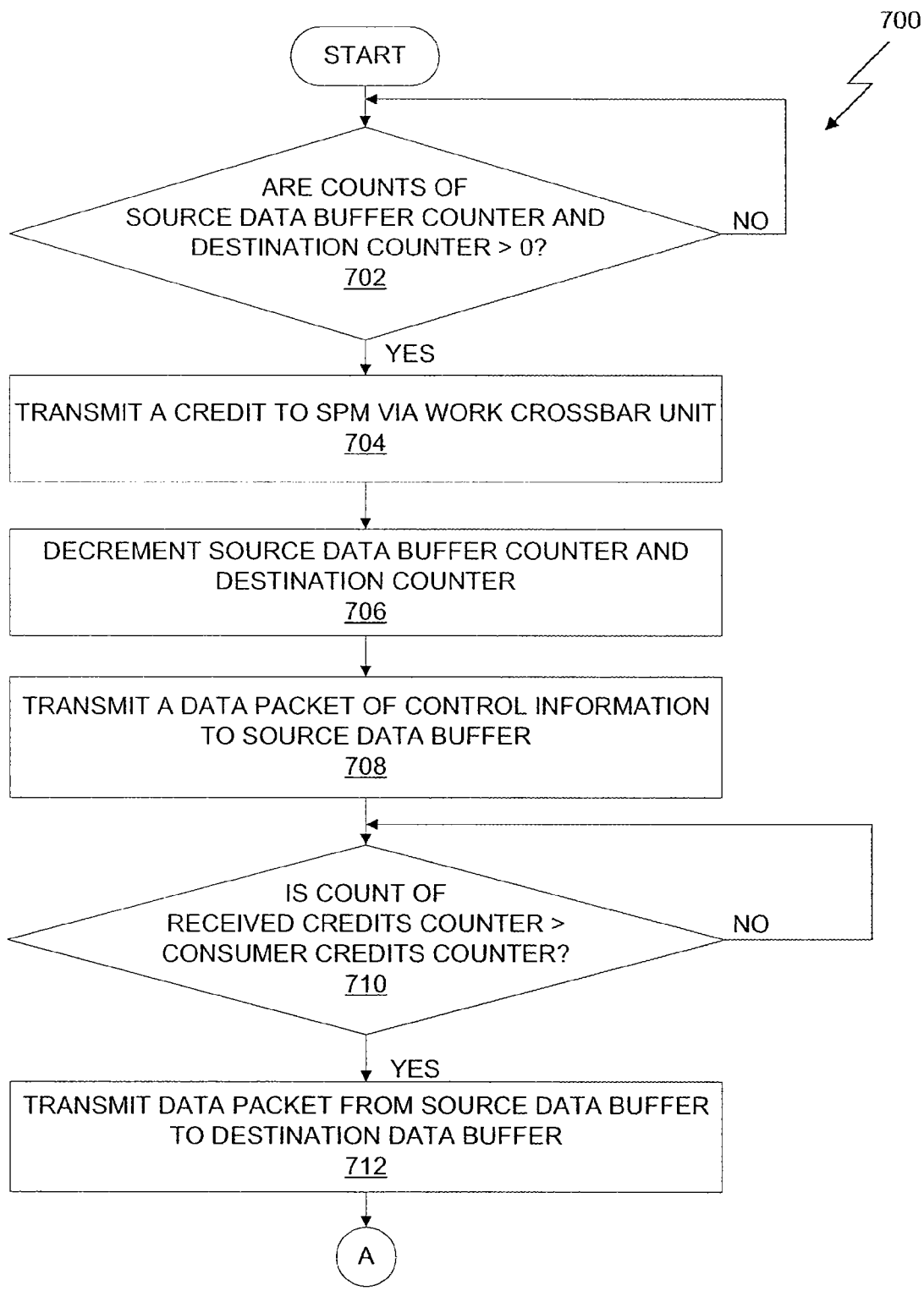
FIGS. 7A and 7B set forth a flow diagram of method steps for transmitting a data packet of control information from the source credit interface of FIG. 5A to the destination credit interface of FIG. 5A, according to one embodiment of the present invention.
Figure 7B:
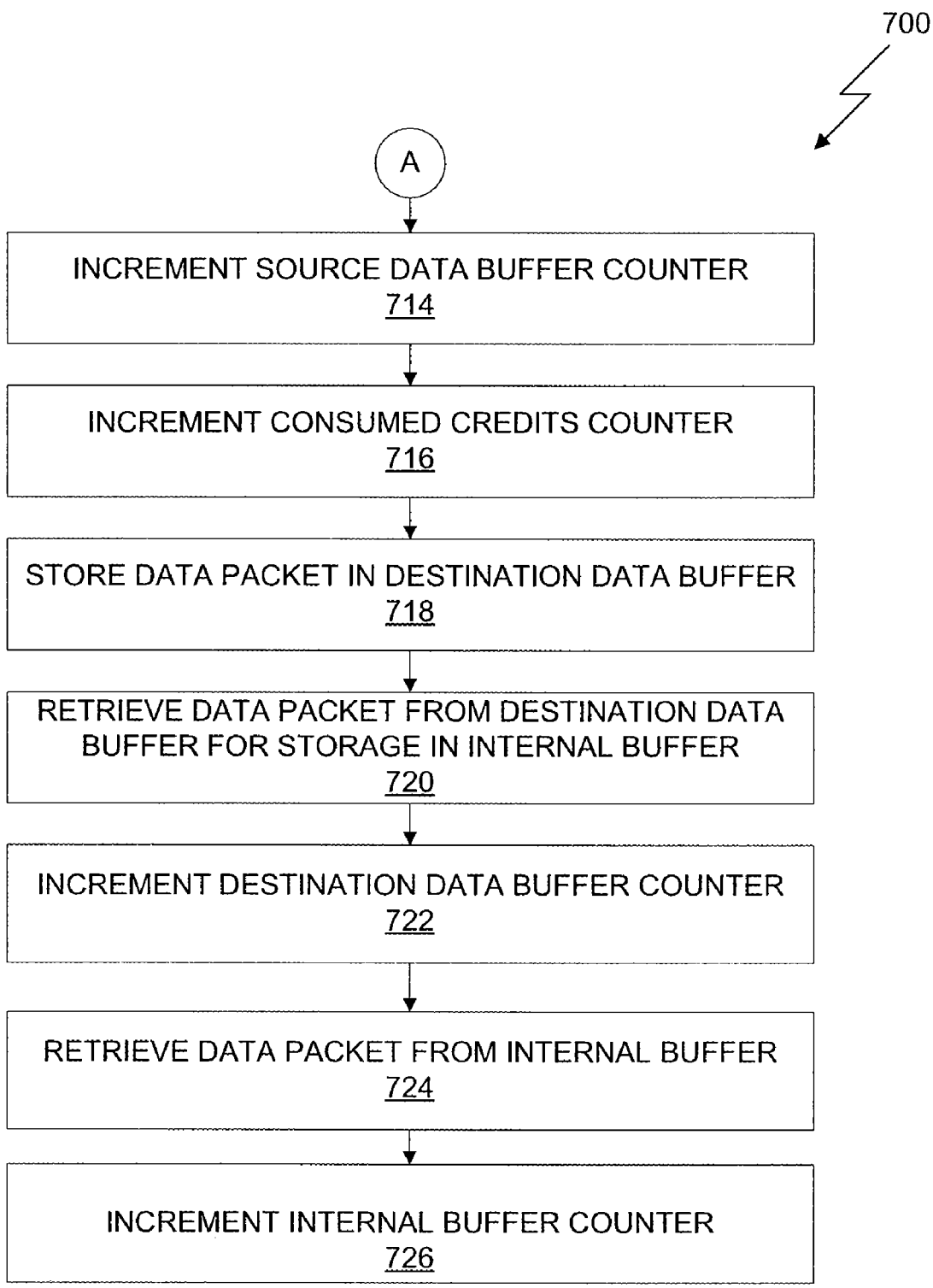

FIGS. 7A and 7B set forth a flow diagram of method steps for transmitting a data packet of control information from the source credit interface 502 of FIG. 5A to the destination credit interface 514 of FIG. 5A, according to one embodiment of the present invention. Although the method steps are described in conjunction with the systems for FIGS. 1-5B, persons skilled in the art will understand that any system configured to perform the method steps, in any order, is within the scope of the invention.

The method 700 begins at step 702, where the source credit releaser 506 within the source credit interface 502 determines the counts of the source data buffer counter 508 and the destination counter 510. As described previously in conjunction with FIG. 5A, the count of the source data buffer counter 508 reflects the number of data packets of control information that can be stored in the memory space available in the source data buffer 504, and the count of the destination counter 510 reflects the number of data packets of control information that can be stored in the memory space available in the destination data buffer 516 and the internal buffer 530. If, at step 702, the count of either of the source data buffer counter 508 or the internal buffer counter 510 is equal to zero, then the source credit releaser 506 continues to poll the source data buffer counter 508 and the internal buffer counter 510 until both counts become greater than zero. The count of either the source data buffer counter 508 or the destination counter 510 is zero when there is no memory space to store a data packet of control information in the source data buffer 504 or in the destination data buffer 516.

If, at step 702, both counts are greater than zero, then the method 700 proceeds to step 704, where the source credit releases 506 transmits a credit to the SPM 310 via the work distribution crossbar 330. Again, the source credit releaser 506 releases a credit only when both counts are greater than zero, which ensures that memory space is available to store the data packet of control information transmitted by the SPM 310 in response to that credit. At step 706, the source credit releaser 506 decrements the counts of both the source data buffer counter 508 and the destination counter 510.

At step 708, the SPM 310 transmits a data packet of control information via the work distribution crossbar 330 to the source data buffer 504 in response to the credit received at step 1204. The data packet of control information is stored in the source data buffer 504 until the data packet is transmitted to the destination data buffer 516. At step 710, the credit consumer 512 determines whether the count of the received credits counter 511 is greater than the count of the consumed credits counter 509. Again, the count of the consumed credits counter 509 reflects the number of credits consumed by the credit consumer 512 to transmit data packets of control information to the destination data buffer 516. The count of the received credits counter 511 reflects the number of credits received by the credit producer 524. As described in conjunction with FIG. 5A, because of the latency in receiving a credit from the destination credit interface 514, the credit consumer 512 may initially consume credits that have not been received by the credit consumer 512. In such a case, the count of the consumed credits counter 509 is greater than the received credits counter 511. If, at step 710, the count of the received credits counter 511 is less than or equal to the count of the consumer credits counter 509, then the credit consumer 512 continues to poll the received credits counter 511 until the count exceeds the count of the consumed credits counter 509.

If, however, at step 710, the count of the received credits counter 511 is greater than the count of the consumed credits counter 509, then, at step 712, the credit consumer 512 causes the data packet of control information stored in the source data buffer 504 to be transmitted to the destination data buffer 516 via the data path 528. At step 714, the count of the source data buffer counter 508 is incremented to indicate the availability of the memory space that was occupied by the newly transmitted data packet of control information. At step 716, the count of the consumed credits counter 509 is incremented by the credit consumer 512 to indicate that a memory space in the destination data buffer 516 is occupied by the data packet of control information.

At step 718, the data packet of control information is stored in the destination data buffer 516 until the data packet is retrieved by the I/O unit 205 for storage in the internal buffer 530, at step 720. At step 722, the count of the destination data buffer counter 518 is incremented to indicate the availability of the memory space in the destination data buffer 516 that was occupied by the data packet of control information. At step 724, the I/O unit 205 retrieves the data packet of control information from the internal buffer 530 for processing. At step 726, the internal buffer counter 520 is incremented to indicate the availability of the memory space in the internal buffer 530 that was occupied by the data packet of control information.

Figure 8:
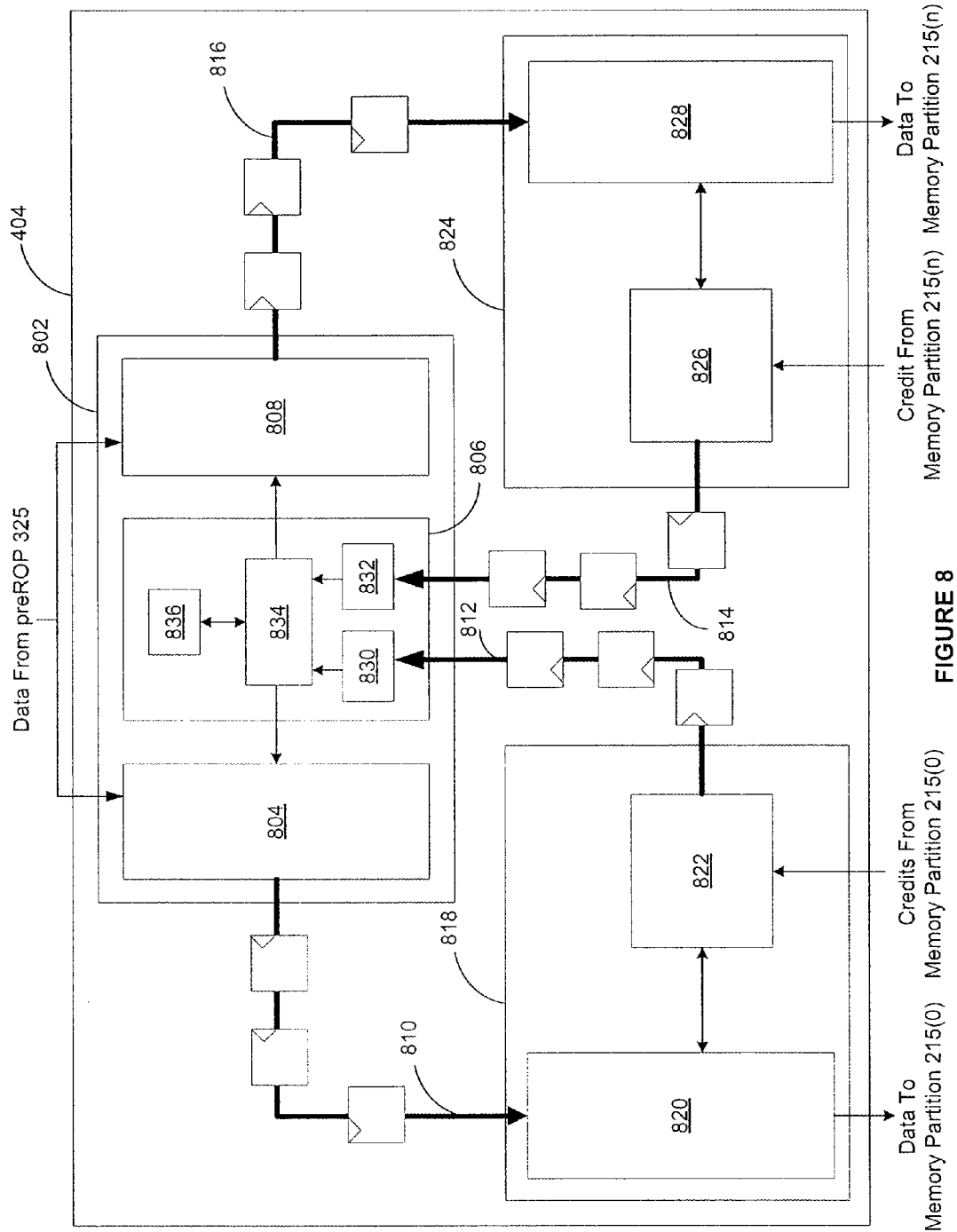
FIG. 8 is a detailed block diagram of the one-to-many connection of FIG. 4, according to one embodiment of the present invention.

FIG. 8 is a detailed block diagram of the one-to-many connection 404 of FIG. 4, according to one embodiment of the present invention. In this embodiment, the one-to-many connection 404 is used to transmit broadcast control information from the preROP 325 to memory partition unit 215(0) and memory partition 215($n$). As shown, the one-to-many connection 404 includes a source credit interface 802, a data path 810, a credit path 812, a destination credit interface 818, a credit path 814, a data path 816 and a destination credit interface 824.

The source credit interface 802 is configured to receive data packets of control information from the preROP 325 for transmission to the destination credit interface 818 and the destination credit interface 824. The source credit interface 802 includes a source data buffer 804, a credit consumer 806 and a source data buffer 808. The destination credit interface 818 and the destination credit interface 824 are configured to transmit credits to the source credit interface 802 and, in response, receive data packets of control information. Again, a credit corresponds to a unit of memory space in which a data packet of control information may be stored.

Each data packet of control information received from the preROP 325 is stored in both the source data buffer 804 and the source data buffer 808. The source data buffer 804 is configured to transmit data packets of control information to the destination credit interface 818 via the data path 810 in response to commands from the credit consumer 806. Similarly, the source data buffer 808 is configured to transmit data packets of control information to the destination credit interface 824 via the data path 816 in response to commands from the credit consumer 806. The credit consumer 806 is configured to receive credits from the destination credit interface 818 and the destination credit interface 824. The credit consumer 806 commands the source data buffer 804 and the source data buffer 808 to transmit data packets of control information to destination credit interface 818 and the destination credit interface 824 based on those received credits.

The destination credit interface 818 includes a credit producer 820 and a destination data buffer 822. The credit producer 820 is configured to determine credit availability based on the memory space available in the destination data buffer 822 and the memory partition 215(0). The credit producer 820 receives a credit from the destination data buffer 822 each time a data packet of control information stored in the destination data buffer 822 is transmitted to the memory partition 215(0). The credit producer 820 also receives a credit from the memory partition 215(0) each time a data packet of control information stored in the memory partition 215(0) is retrieved for further processing. When the counts of the credits received from the destination data buffer 822 and the memory partition 215(0) are greater than zero, the credit producer 820 transmits a credit to the credit consumer 806 via the credit path 812. Transmitting credits to the credit consumer 806 only if the counts of the credits received from the destination data buffer 822 and the memory partition 215(0) are greater than zero ensures that the number of data packets of control information transmitted by the source data buffer 804 does not exceed the memory space available within the destination credit interface 818 and the memory partition 215(0).

Similarly, the destination credit interface 824 includes a credit producer 826 and a destination data buffer 828. The credit producer 826 is configured to determine credit availability based on the memory space available in the destination data buffer 828 and the memory partition 215(n). The credit producer 826 receives a credit from the destination data buffer 828 each time a data packet of control information stored in the destination data buffer 828 is transmitted to the memory partition 215(n). The credit producer 826 also receives a credit from the memory partition 215(n) each time a data packet of control information stored in the memory partition 215(n) is retrieved for further processing. When the counts of the credits received from the destination data buffer 828 and the memory partition 215(n) are greater than zero, the credit producer 826 transmits a credit to the credit consumer 806 via the credit path 814.

The credit consumer 806 includes a received credits counter 830 and a received credits counter 832, a credit consumer logic unit 834 and consumed credits counter 836. The counts of the received credits counter 830 and the received credits counter 836 reflect the number of credits received via the credit path 812 and the credit path 814, respectively. Each time a credit is received from the credit producer 820 via the credit path 812, the credit consumer 806 increments the received credits counter 830. Similarly, each time a credit is received from the credit producer 826 via the credit path 814, the credit consumer 806 increments the received credits counter 832. The count of the consumed credits counter 836 reflects the number of credits that have been consumed by the credit consumer 806 to cause data packets of control information to be transmitted from each of the source data buffer 804 and the source data buffer 808.

The credit consumer logic unit 834 commands the source data buffer 804 to transmit a data packet of control information to the destination data buffer 822 via the data path 810 each time the counts of both the received credits counter 830 and the received credits counter 832 are greater than the count of the consumed credits counter 836. Concurrently, the credit consumer logic unit 834 commands the source data buffer 808 to transmit a data packet of control information to the destination data buffer 828 via the data path 816. The credit consumer logic unit 834 then increments the count of the consumer credits counter 836. Transmitting data packets of control information only when the counts of both the of both the received credits counter 830 and the received credits counter 832 are greater than the count of the consumed credits counter 836 to ensure that there is no discrepancy in the number of data packets stored in each of the source data buffer 808 and source data buffer 804.

Figure 9:
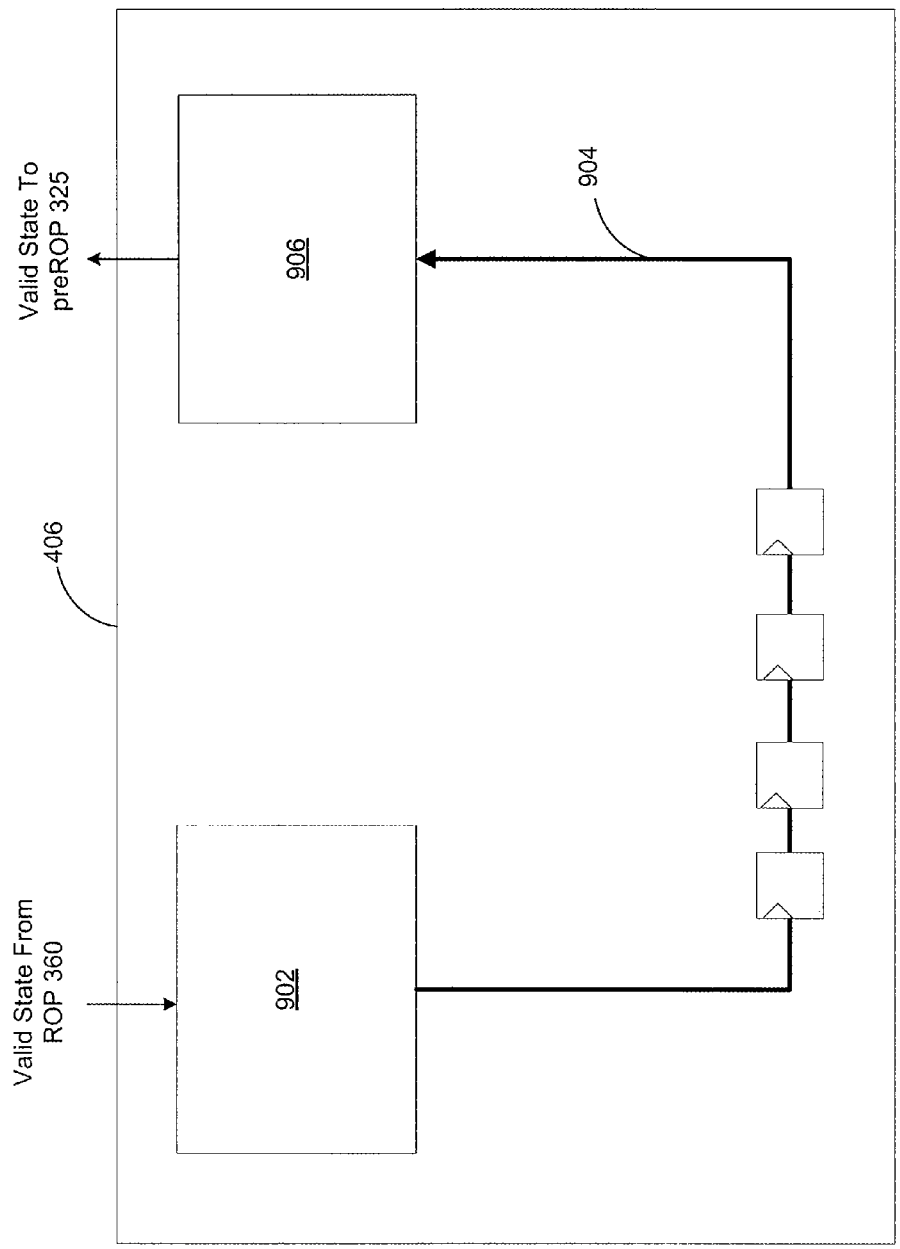
FIG. 9 is a detailed block diagram of the valid-to-one connection of FIG. 4, according to one embodiment of the present invention.

FIG. 9 is a detailed block diagram of the valid-to-one connection 406 of FIG. 4, according to one embodiment of the present invention. As shown, the valid-to-one connection 406 includes a valid state accumulator 902, a data path 904 and a valid state dispenser 906. In this embodiment, the valid-to-one connection 406 is used to transmit valid states indicating memory space availability from the ROP 360 within the memory partition unit 215(n) to the preROP 325.

The ROP 360 transmits a valid state to the valid state accumulator 902 for each memory space available within the ROP 360. The count of the valid state accumulator 902 is incremented each time a valid state is received. The number of bits allocated to the valid state accumulator 902 is pre-determined based on the total size of the memory space in the ROP 360. For example, if the total size of memory space available in the ROP 360 is twenty, then the five bits are allocated to the valid state accumulator 902 to store a maximum count of twenty. Allocating enough bits to the valid state accumulator 902 ensures that the number of valid states transmitted to the valid state accumulator 902 does not exceed the maximum count that can be stored within the valid state accumulator 902. When the count of the valid state accumulator 902 is greater than zero, the valid state accumulator 902 transmits a valid state (i.e. a single pulse or a single high signal) to the valid state dispenser 906 via the data path 904. The count of the valid state accumulator 902 is then decremented. At any given clock cycle, the count of the valid state accumulator 902 reflects the number of valid states received from the ROP 360 that have not been transmitted to the valid state dispenser 906 via the data path 904. The valid state accumulator 902 continues to transmit valid states to the valid state dispenser 906 via the data path 904 until the count of the valid state accumulator 902 is decremented to zero.

When a valid state transmitted by the valid state accumulator 902 is received by the valid state dispenser 906 via the data path 904, the count of the valid state dispenser 906 is incremented. As with the valid state accumulator 902, the number of bits allocated to the valid state dispenser 906 is pre-determined based on the total size of the memory space in the ROP 360. The count of the valid state dispenser 906 continues to increment until the count of the valid state accumulator 902 is zero. At such a clock cycle, the valid states transmitted by the ROP 360 have all been transmitted to the valid state dispenser 906, and the count of the valid state dispenser 906 reflects the memory space availability within the ROP 360. The preROP 325 retrieves the count of the valid state dispenser 906 for further processing. The count of the valid state dispenser 906 is then set to zero.

Figure 10:
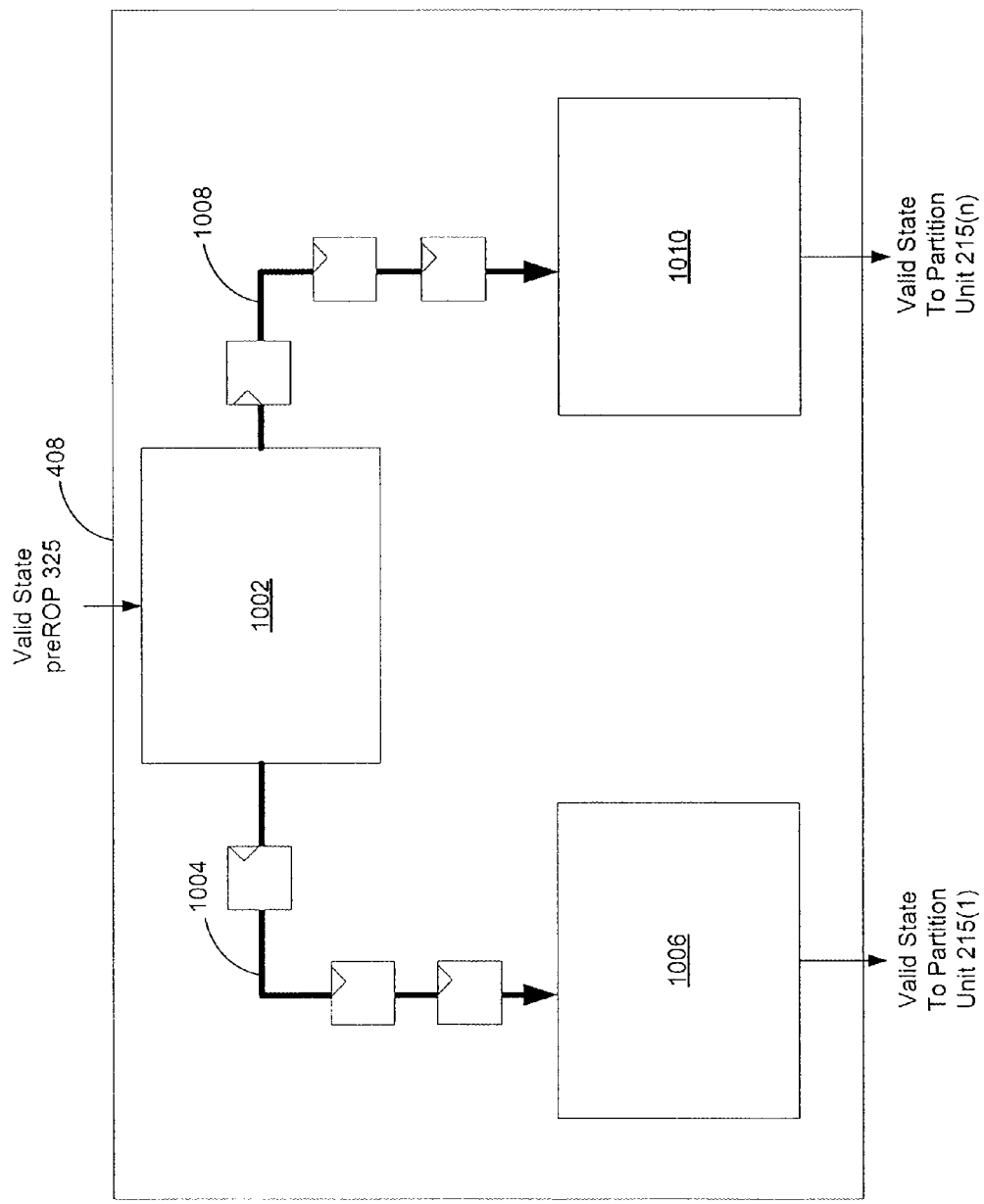
FIG. 10 is a detailed block diagram of the valid-to-many connection of FIG. 4, according to one embodiment of the present invention.

FIG. 10 is a detailed block diagram of the valid-to-many connection 408 of FIG. 4, according to one embodiment of the present invention. As shown, the valid-to-many connection 408 includes a valid state accumulator 1002, a data path 1004, a valid state dispenser 1006, a data path 1008 and a valid state dispenser 1010. In this embodiment, the valid-to-one connection 408 is used to transmit valid states indicating memory space availability from the preROP 325 to the ROP 360 within the memory partition 215(0) and the ROP 360 within the memory partition 215(n).

The preROP 325 transmits a valid state to the valid state accumulator 1002 for each memory space available within the preROP 325. The count of the valid state accumulator 1002 is incremented each time a valid state is received. The number of bits allocated to the valid state accumulator 1002 is pre-determined based on the total size of the memory space in the preROP 325. When the count of the valid state accumulator 1002 is greater than zero, the valid state accumulator 1002 transmits a valid state (i.e. a single pulse or a single high signal) to the valid state dispenser 1006 via the data path 1004. Concurrently, the valid state accumulator 1002 transmits a valid state to the valid state dispenser 1010 via the data path 1008. The count of the valid state accumulator 1002 is then decremented. At any given clock cycle, the count of the valid state accumulator 1002 reflects the number of valid states received from the preROP 325 that have not been transmitted to the valid state dispenser 1006 and the valid state dispenser 1010. The valid state accumulator 1002 continues to transmit valid states in this fashion until the count of the valid state accumulator 902 is decremented to zero.

When a valid state transmitted by the valid state accumulator 1002 is received by the valid state dispenser 1006 via the data path 1004, the count of the valid state dispenser 1006 is incremented. Similarly, the count of the valid state dispenser 1010 is incremented when a valid state is received from the valid state accumulator 1002 via the data path 1008. The counts of the valid state dispenser 1006 and the valid state dispenser 1010 continue to increment until the count of the valid state accumulator 1002 is zero. At such a clock cycle, the valid states transmitted by the preROP 325 have been received by the valid state dispenser 1006 and the valid state dispenser 1010. The counts of the valid state dispenser 1006 and the valid state dispenser 1010 reflect the memory space availability within the preROP 325. The ROP 360 within the memory partition 215(1) then retrieves the count of the valid state dispenser 1006 for further processing, and the count of the valid state dispenser 1006 is set to zero. The ROP 360 within the memory partition 215(n) also retrieves the count of the valid state dispenser 1010 for further processing, and the count of the valid state dispenser is set to zero.

Figure 11:
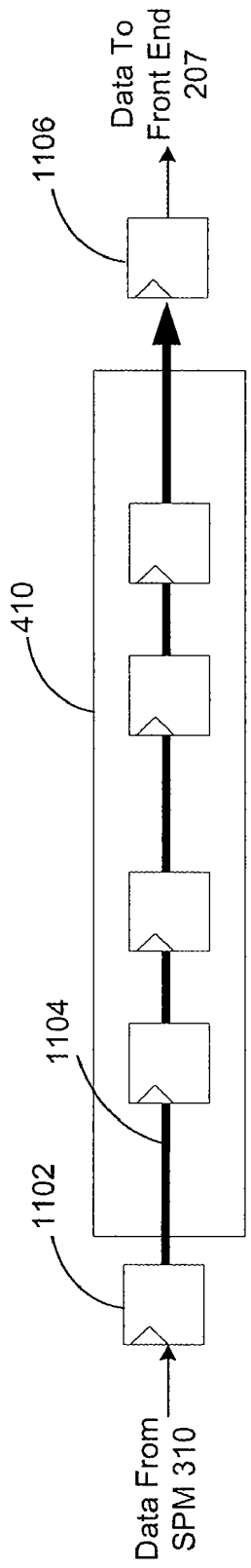
FIG. 11 is a detailed block diagram of the wire-to-one connection of FIG. 4, according to one embodiment of the present invention.

FIG. 11 is a detailed block diagram of the wire-to-one connection 410 of FIG. 4, according to one embodiment of the present invention. As shown, the wire-to-one connection 410 includes a source synchronization flop 1102, data path 1104 and a destination synchronization flop 1106. In this embodiment, the wire-to-one connection 410 is used to transmit data packets of control information from the SPM 310 to the front end 207.

A data packet of control information is transmitted from the SPM 310 to the source synchronization flop 1102. Because the clock domains of the SPM 310 and the data path 1104 are different, the data packet of control information is synchronized with the clock domain of the data path 1104 in the source synchronization flop 1102. The data packet of control information is then transmitted to the destination synchronization flop 1106 via the data path 1104. When the data packet of control information is received by the destination synchronization flop 1106, the data packet of control information is synchronized with the clock domain of the front end 207 and transmitted to the front end 207 for further processing. In this fashion, the SPM 310 data packets of control information one-by-one to the front end 207.

Figure 12:
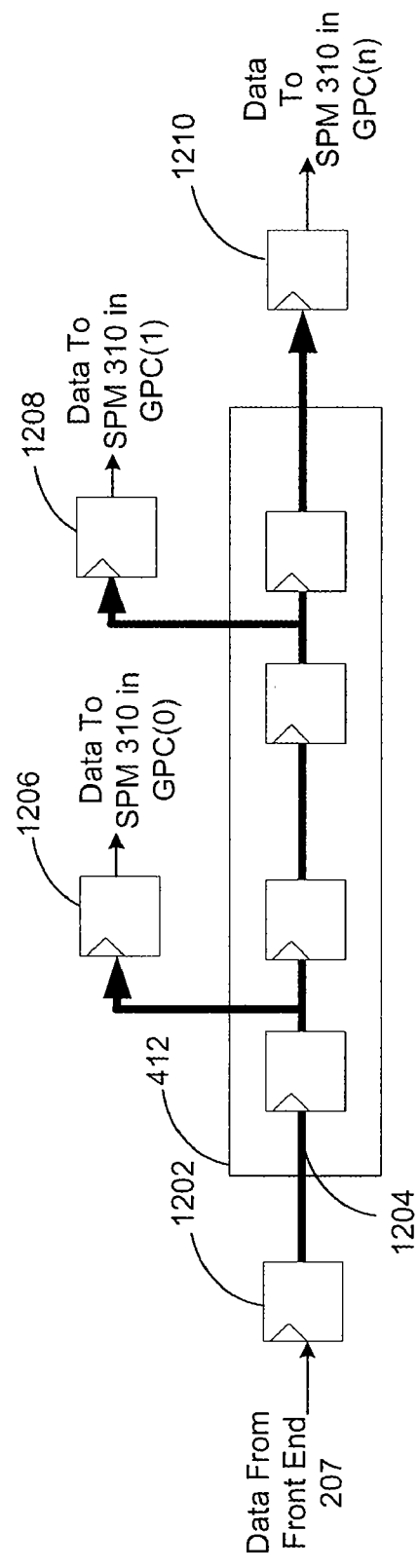
FIG. 12 is a detailed block diagram of the wire-to-many connection of FIG. 4, according to one embodiment of the present invention.

FIG. 12 is a detailed block diagram of the wire-to-many connection 412 of FIG. 4, according to one embodiment of the present invention. As shown, the wire-to-many connection 412 includes a source synchronization flop 1202, a data path 1204, a destination synchronization flop 1206, a destination synchronization flop 1208 and a destination synchronization flop 1210. In this embodiment, the wire-to-many connection 412 is used to transmit data packets of control information from the front end 207 310 to the SPM 310 in the GPC(0), the SPM 310 in the GPC(1) and the SPM 310 in the GPC(n).

A data packet of control information is transmitted from the SPM 310 to the source synchronization flop 1202. Because the clock domains of the front end 207 and the data path 1204 are different, the data packet of control information is synchronized with the clock domain of the data path 1204 in the source synchronization flop 1202. The data packet of control information is then transmitted to the destination synchronization flop 1206, the destination synchronization flop 1208 and the destination synchronization flop 1210 via the data path 1204. When the data packet of control information is received by the destination synchronization flop 1206, the data packet of control information is synchronized with the clock domain of the SPM 310 within the GPC(0) and transmitted to that SPM 310 for further processing. Similarly, when the data packet of control information is received by the destination synchronization flop 1208 and the destination synchronization flop 1210, the data packet of control information is synchronized with the clock domain of the SPM 310 within the GPC(1) and the clock domain of the SPM 310 within the GPC(n), respectively. The data packets of control information are then transmitted from the destination synchronization flop 1208 and the destination synchronization flop 1210 to the SPM 310 within the GPC(1) and the SPM 310 within the GPC(n), respectively, for further processing. In this fashion, the front end 207 transmits data packets of control information one-by-one to the different SPMs 310.

In sum, the control crossbar unit is designed to transmit control information from control information generators to destination components within the computer system. The control information may belong to various traffic paradigms, such as short-latency data traffic, narrow-width data traffic or broadcast data traffic. The physical connections within the control crossbar unit are categorized based on the different types of control information being transmitted through the control crossbar unit. The physical connections belong to the following categories: one-to-one (OTO) connections, one-to-many (OTM) connections, valid-to-one (VTO) connections, valid-to-many (VTM) connections wire-to-one (WTO) connections and wire-to-many (WTM) connections.

An OTO connection provides a dedicated data transmission channel with flow control between a control information generator and a destination component. An asynchronous first-in-first-out (FIFO) buffer is coupled to the destination component and used to store the control information received from the control information generator. As each component within the system has a dedicated clock domain, the control information is stored in the asynchronous FIFO buffer until the control information can be brought into the clock domain of the destination component. A credit interface is used to guarantee that, at any given clock cycle, the number of in-flight control data packets is less than or equal to the space available in the asynchronous FIFO buffer. A credit represents a single bit or a collection of bits in the asynchronous FIFO buffer in which control information is stored. The credit interface includes a credit consumer coupled to the control information generator and a credit producer coupled to the destination component. A credit path is coupled to the credit consumer and the credit producer and transmits credits from the credit producer to the credit consumer. The credit consumer receives credits (based on the size of the asynchronous FIFO buffer) from the credit producer. A credit is consumed when a data packet of control information is transmitted from the control information generator to a destination component. A credit is produced when data is output from the asynchronous FIFO buffer within the destination component. An OTO connection guarantees the delivery of control information from the control information generator to the destination component.

An OTM connection provides a dedicated data transmission channel with flow control between a control information generator and several destination components. Each destination component is coupled to a different asynchronous FIFO buffer and a different credit producer. The credit consumer within the control information generator is configured to keep track of the credits available in each of the asynchronous FIFO buffers within the destination components. The OTM connection is used for broadcast data traffic where the delivery of control information to the destination components needs to be guaranteed.

A VTO connection provides a dedicated data transmission channel that transmits valid states from the control information generator to a destination component. The destination component is coupled to a counter that is incremented each time a valid state is received from the control information generator. A VTO connection is used to transmit narrow-width data traffic without flow control. A VTM connection provides a dedicated data transmission channel that transmits valid states from the control information generator to several destination components. Each of the destination components is coupled to a different counter that increments each time a valid state is received from the control information generator. A VTM connection is used to broadcast narrow-width data traffic without flow control.

A WTO connection provides a dedicated data transmission channel without flow control between a control information generator and a destination component. A WTO connection comprises of wires with several stages of data flops. A WTO connection is used by control information generators that transmit infrequent data traffic as there is no flow control and delivery cannot be guaranteed. A WTM connection provides a dedicated data transmission channel without flow control between a control information generator and several destination components. A WTM connection is used for broadcast infrequent data traffic.

One advantage of the disclosed control crossbar unit is that it implements different types of dedicated transmission channels to transmit different types of control information to destination components within the parallel processing unit. Using the control crossbar unit in this fashion reduces the load on the main crossbar unit. Further, bandwidth waste that normally would occur if the same transmission channel were used to transmit the different types of control information is reduced because each of the dedicated transmission channels is optimized to efficiently transmit a particular type of control information.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A system for flow control in a connection included within a control crossbar that routes control information generated by a control information generator to one or more destination components, the system comprising:
   a valid state accumulator coupled to the control information generator;
   one or more valid state dispensers, wherein each valid state dispenser is coupled to a different one of the one or more destination components; and
   one or more data paths, wherein each data path connects the valid state accumulator to a different one of the one or more valid state dispensers,
   wherein the valid state accumulator is configured to receive one or more valid states from the control information generator and to transmit the one or more valid states to each of the one or more valid state dispensers,
   wherein the valid state accumulator has a count that is incremented for each valid state received from the control information generator and decremented for each valid state transmitted to each of the one or more valid state dispensers,
   wherein the valid state accumulator is configured to continue transmitting valid states to each of the one or more valid state dispensers until the count of the valid state accumulator equals zero,
   wherein each of the valid state dispensers has a count that is incremented for each valid state received from the valid state accumulator,
   wherein the count of each of the valid state dispensers, once the count of the valid state accumulator equals zero, reflects an amount of available memory space associated with the control information generator, and
   wherein, once the count of the valid state accumulator equals zero, each valid state dispenser transmits the count of the valid state dispenser to the destination component coupled to the valid state dispenser.

2. The system of claim 1, wherein the control information generator comprises a raster operations unit, and the destination component comprises a pre-raster operations unit.

3. The system of claim 1, wherein the control information generator comprises a pre-raster operations unit, and each of the one or more destination components comprises a raster operations unit included in a memory partition.

4. A computing device, comprising:
   a system memory; and
   a parallel processing unit coupled to the system memory and including a control crossbar configured to route control information generated by a control information generator within the parallel processing unit to one or more destination components within the parallel processing unit, the control crossbar including:
      a valid state accumulator coupled to the control information generator,
      one or more valid state dispensers, wherein each valid state dispenser is coupled to a different one of the one or more destination components, and
      one or more data paths, wherein each data path connects the valid state accumulator to a different one of the one or more valid state dispensers,
      wherein the valid state accumulator is configured to receive one or more valid states from the control information generator and to transmit the one or more valid states to each of the one or more valid state dispensers,
      wherein the valid state accumulator has a count that is incremented for each valid state received from the control information generator and decremented for each valid state transmitted to each of the one or more valid state dispensers,
      wherein the valid state accumulator is configured to continue transmitting valid states to each of the one or more valid state dispensers until the count of the valid state accumulator equals zero,
      wherein each of the valid state dispensers has a count that is incremented for each valid state received from the valid state accumulator,
      wherein the count of each of the valid state dispensers, once the count of the valid state accumulator equals zero, reflects an amount of available memory space associated with the control information generator, and
      wherein, once the count of the valid state accumulator equals zero, each valid state dispenser transmits the count of the valid state dispenser to the destination component coupled to the valid state dispenser.

5. The computing device of claim 4, wherein the control information generator comprises a raster operations unit, and the destination component comprises a pre-raster operations unit.

6. The computing device of claim 4, wherein the control information generator comprises a pre-raster operations unit, and each of the one or more destination components comprises a raster operations unit included in a memory partition.

7. A method for flow control in a connection included within a control crossbar included in a parallel processing unit that routes control information generated by a control information generator within the parallel processing unit to one or more destination components within the parallel processing unit, the method comprising:

receiving one or more valid states from the control information generator;

incrementing a first count for each valid state received from the control information generator;

transmitting the one or more valid states to each of one or more valid state dispensers until the first count equals zero, wherein each valid state dispenser is coupled to a different one of the one or more destination components;

decrementing the first count for each valid state transmitted to each of the one or more valid state dispensers; and incrementing a second count associated with each of the one or more valid state dispensers for each of the received valid states, wherein the second count associated with each of the one or more valid state dispensers, once the first count equals zero, reflects an amount of available memory space associated with the control information generator, and wherein, once the first count equals zero, each valid state dispenser transmits the count of the valid state dispenser to the destination component coupled to the valid state dispenser.

8. The method of claim 7, wherein the control information generator comprises a raster operations unit, and the destination component comprises a pre-raster operations unit.

9. The method of claim 7, wherein the control information generator comprises a pre-raster operations unit, and each of the one or more destination components comprises a raster operations unit included in a memory partition.

\* \* \* \* \*